US009430736B2

(12) United States Patent
Thibeault et al.

(10) Patent No.: US 9,430,736 B2
(45) Date of Patent: Aug. 30, 2016

(54) FIRING RATE INDEPENDENT SPIKE MESSAGE PASSING IN LARGE SCALE NEURAL NETWORK MODELING

(71) Applicant: HRL LABORATORIES, LLC, Malibu, CA (US)

(72) Inventors: Corey Thibeault, Valley Village, CA (US); Kirill Minkovich, Campbell, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 344 days.

(21) Appl. No.: 14/094,589

(22) Filed: Dec. 2, 2013

(65) Prior Publication Data

US 2014/0156578 A1    Jun. 5, 2014

Related U.S. Application Data

(60) Provisional application No. 61/732,621, filed on Dec. 3, 2012.

(51) Int. Cl.
*G06N 3/04* (2006.01)

(52) U.S. Cl.
CPC ..................... *G06N 3/049* (2013.01)

(58) Field of Classification Search
None
See application file for complete search history.

(56) References Cited

U.S. PATENT DOCUMENTS

| 2007/0038588 A1 | 2/2007 | Sullivan et al. |
| 2009/0099989 A1 | 4/2009 | Ananthanarayanan et al. |
| 2010/0299295 A1 | 11/2010 | Leitheiser |
| 2011/0106741 A1 | 5/2011 | Denneau |
| 2013/0031040 A1* | 1/2013 | Modha .................. G06N 3/409 706/27 |
| 2013/0073497 A1* | 3/2013 | Akopyan ............... G06N 3/049 706/27 |
| 2015/0058268 A1* | 2/2015 | Modha .................. G06N 3/049 706/27 |

FOREIGN PATENT DOCUMENTS

WO    2007-096954    8/2007

OTHER PUBLICATIONS

"Computational Neuroscience: Theory, Development and Applications in Modeling The Basal Ganglia", Corey M. Thibeault, Dissertation, University of Nevada, Reno, UMI No. 3550403, Dec. 2012, 328 pages.*

(Continued)

*Primary Examiner* — Kakali Chaki
*Assistant Examiner* — Mai T Tran
(74) *Attorney, Agent, or Firm* — Ladas & Parry (57) ABSTRACT

A neural network portion comprising N pre-synaptic neurons capable each of firing an action potential, wherein the number N can be encoded in a word of n bits;
  the neural network portion being provided for, upon firing of a number F of pre-synaptic neurons in a predetermined period of time:
  if $F.n<N$, generating a first type message, the message comprising a unique address for each pre-synaptic neuron having fired in said predetermined period of time, each address being encoded as a word of n bits; and
  if $F.n>N$, generating a second type message, the message comprising N bits and being encoded in words of n bits, wherein each one of said N pre-synaptic neurons is represented by a unique bit, each bit having a first value if the pre-synaptic neuron represented by the bit fired in said predetermined period of time, and a second value otherwise.

22 Claims, 7 Drawing Sheets

(56) References Cited

OTHER PUBLICATIONS

M. Mahowald, "VLSI analogs of neuronal visual processing: A synthesis of form and function," Ph.D. dissertation, California Inst. Technol., Pasadena, CA, 1992.

K. Boahen, "A burst-mode word-serial address-event link-I: transmitter design," IEEE Transactions on Circuits and Systems I, vol. 51, No. 7, pp. 1269-1280, 2004.

K. Boahen, "A burst-mode word-serial address-event link-II: receiver design," IEEE Transactions on Circuits and Systems I, vol. 51, No. 7, pp. 1281-1291, 2004.

K. Boahen, "Point-to-point connectivity between neuromorphic chips using address events," IEEE Transactions on Circuits and Systems I, vol. 47, No. 7, pp. 416-434, 2000.

Navaridas, et al., "Understanding the interconnection network of SpiNNaker," In Proceedings of the $3^{rd}$ International Conference on Supercomputing (ICS '09). ACM, New York, NY, USA, pp. 286-295, 2009.

M. D. Humphries, et al., A physiologically plausible model of action selection and oscillatory activity in the basal ganglia, The Journal of Neuroscience, vol. 26, No. 50, pp. 12921-12942, 2006.

C.M. Thibeault, et al., "A novel multi-gpu neural simulator," in ISCA's $3^{rd}$ International Conference on Bioinformatics and Computational Biology (BICoB '11), New Orleans, Louisiana, Mar. 2011.

ISR and WO for related PCT/US2013/072698 mailed on Sep. 24, 2014.

IPRP for related PCT/US2013/072698 issued on Jun. 9, 2015.

\* cited by examiner

FIRING RATE INDEPENDENT SPIKE MESSAGE PASSING IN LARGE SCALE NEURAL NETWORK MODELING

RELATED APPLICATIONS

The present application claims priority of provisional U.S. patent application No. 61/732,621 filed Dec. 3, 2012, which is hereby incorporated by reference.

STATEMENT REGARDING FEDERALLY SPONSORED RESEARCH OR DEVELOPMENT

The present invention was made with support from the United States Government under Grant number HR0011-09-C-0001 (SyNAPSE) awarded by the Defense Advanced Research Project Agency (DARPA). The United States Government has certain rights in the invention.

FIELD OF THE INVENTION

The present invention relates generally to neural networks, and in particular to efficiently passing neural firing information in neural networks.

BACKGROUND

Current computing and software paradigms have so far prevented truly scalable neural models that may simulate biology in reasonable amounts of time.

There are two major steps in simulating a neural network such as a nervous system: incrementally solving governing equations in various part of the network or system; and communicating the results to other parts of the network or system.

Exemplary systems may include one or more of the following: M. Mahowald, "VLSI analogs of neuronal visual processing: A synthesis of form and function," Ph.D. dissertation, California Inst. Technol., Pasadena, Calif., 1992; K. Boahen, "A burst-mode word-serial address-event link-I: transmitter design," *IEEE Transactions on Circuits and Systems I*, vol. 51, no. 7, pp. 1269-80, 2004; K. Boahen, "A burst-mode word-serial address-event link-II: receiver design," *IEEE Transactions on Circuits and Systems I*, vol. 51, no. 7, pp. 1281-91, 2004; K. Boahen, "Point-to-point connectivity between neuromorphic chips using address events," *IEEE Transactions on Circuits and Systems II*, vol. 47, no. 5, pp. 416-34, 2000; Javier Navaridas, Mikel Luján, Jose Miguel-Alonso, Luis A. Plana, and Steve Furber. 2009. Understanding the interconnection network of SpiNNaker. In Proceedings of the 23rd international conference on Supercomputing (ICS '09). ACM, New York, N.Y., USA, 286-295; M. D. Humphries, R. D. Stewart, and K. N. Gurney, "A physiologically plausible model of action selection and oscillatory activity in the basal ganglia," *The Journal of Neuroscience*, vol. 26, no. 50, pp. 12921-12942, 2006; C. M. Thibeault, R. Hoang, and F. C. Harris Jr., "A novel multi-gpu neural simulator," in ISCA's 3rd International Conference on Bioinformatics and Computational Biology (BICoB '11), New Orleans, La., March 2011.

It is known to distribute the simulation of a large neural network. Different portions of the model are then simulated by separate computers or nodes in parallel. The neural model is integrated at each iteration, and the spiking information is sent to all of the neurons connected to those that fired.

Ideally, when parallelizing the simulation of spiking neural networks the computational cost of the mathematical integration and synaptic computations is balanced with cost of communicating information between nodes (single computers within a cluster). Historically, the communication time was significantly lower than the compute time. With the introduction of higher-performance architectures such as General Purpose Graphical Processing Units (GPGPU) and specialized neural hardware systems, this is no longer the case. However, the way spiking information is sent has not changed.

Known hardware and software simulation environments use a variant of address event representation (see for example the Boahen, 2000 reference above). The simplest form of such an address event representation is that when a neuron fires an action potential, an ID number unique to the neuron is sent to all of the nodes that contain post-synaptic neurons connected to the one that fired. The addresses of all the neurons that fire during the current iteration can be collected and sent as a single packet to all of the connected nodes.

As the number of neurons that fired increases, however, the size of the address packets correspondingly increases. In this case, the time spent in communication is a direct correlation to the number of neurons that fired. Similarly, as the number of compute nodes increases so does the number of packets that need to be sent. In some cases, for both software and hardware based systems, this can prevent scaling up to desirable model sizes.

The present disclosure relates to systems and methods for preventing the size of the address packets to increase as in the known schemes described above.

SUMMARY

Apparatus, systems, and/or methods are described to dynamically switch between one or more communication protocols that enable deterministic performance, variations in neuron firing rates, and/or scalability for passing messages throughout a simulated system or neural network. In one embodiment, the communication protocols may include Address Event Representation (AER) and bit packing. The bit packing methods may include dummy neurons and a grouping of an encoding of the bits.

An embodiment of the present disclosure comprises a neural network portion comprising a number N of pre-synaptic neurons capable each of firing an action potential, wherein N can be encoded in a word of n bits, n being smaller than N; the neural network portion being provided for, upon firing of a number F of pre-synaptic neurons in a predetermined period of time: if F multiplied by n<N, generating a message of a first type, the message comprising a unique address for each pre-synaptic neuron having fired in said predetermined period of time, each address being encoded as a word of n bits; and if F multiplied by n>N, generating a message of a second type, the message comprising N bits and being encoded in words of n bits, wherein each one of said N pre-synaptic neurons is represented by a unique bit, each bit having a first value if the pre-synaptic neuron represented by the bit has fired in said predetermined period of time, and a second value otherwise. If F multiplied by n=N, either a message of the first type or of the second type can be generated.

According to an embodiment of the present disclosure, n and N are such that $2^{n-1}<N<=2^n$.

According to an embodiment of the present disclosure, the neural network further comprises a post synaptic neuron associated to at least some of the N pre-synaptic neurons, the neural network portion being provided to decode either of said message of the first type and said message of the second type and, in response to said decoding, send to the post synaptic neuron information of which one of the N pre-synaptic neurons associated to the post-synaptic neuron have fired in said predetermined period of time; the pre-synaptic neurons being arranged in a first node of the neural network portion and the post-synaptic neuron being arranged in a second node of the neural network portion.

According to an embodiment of the present disclosure, the neural network portion is provided to synchronize the messages of the first and second types as if the post and pre-synaptic neurons were located on a same computer node.

According to an embodiment of the present disclosure, the neural network portion further comprises a number N of post synaptic neurons associated each to a single pre-synaptic neuron, the neural network portion being provided to decode either of said message of the first type and said message of the second type, and in response to said decoding to cause the firing of each post synaptic neuron associated to a pre-synaptic neuron that fired in said predetermined period of time; the pre-synaptic neurons being arranged in a first node of the neural network portion and the post-synaptic neurons being arranged in a second node of the neural network portion.

An embodiment of the present disclosure comprises a neural network system comprising: a number p of neural network portions as disclosed above, comprising each a group of Ni pre-synaptic neurons, with i=1 to p.

According to an embodiment of the present disclosure, in the neural network system, the post-synaptic neurons associated with each group of pre-synaptic neurons are distinct.

According to an embodiment of the present disclosure, in the neural network system, at least two of the groups of Ni pre-synaptic neurons share at least one common pre-synaptic neuron.

According to an embodiment of the present disclosure, said messages of the first and second type comprise each a header indicating the type of the message.

According to an embodiment of the present disclosure, the header of said message of the first type further indicates the number F.

According to an embodiment of the present disclosure, the sensitivity of the post synaptic neuron to the firing of at least some of the pre-synaptic neurons is plastic.

An embodiment of the present disclosure comprises a method of transmitting firing information in a neural network portion having a number N of pre-synaptic neurons capable each of firing an action potential, wherein N can be encoded in a word of n bits; the method comprising, upon firing of a number F of pre-synaptic neurons in a predetermined period of time: if F multiplied by n (hereafter "F.n") <N, generating a message of a first type, the message comprising a unique address for each pre-synaptic neuron having fired in said predetermined period of time, each address being encoded as a word of n bits; and if F.n>N, generating a message of a second type, the message comprising N bits and being encoded in words of n bits, wherein each one of said N pre-synaptic neurons is represented by a unique bit, each bit having a first value if the pre-synaptic neuron represented by the bit has fired in said predetermined period of time, and a second value otherwise.

According to an embodiment of the present disclosure, n and N are such that $2^{n-1}<N<=2^n$.

According to an embodiment of the present disclosure, the neural network portion comprises a post synaptic neuron associated to at least some of the N pre-synaptic neurons; the pre-synaptic neurons being arranged in a first node of the neural network portion and the post-synaptic neuron being arranged in a second node of the neural network portion; the method comprising: decoding either of said message of the first type and said message of the second type; and in response to said decoding, sending to the post synaptic neuron information about which ones of the N pre-synaptic neurons associated to the post-synaptic neuron have fired in said predetermined period of time.

According to an embodiment of the present disclosure, the neural network portion comprises a number N of post synaptic neurons associated each to a single pre-synaptic neuron; the pre-synaptic neurons being arranged in a first node of the neural network portion and the post-synaptic neurons being arranged in a second node of the neural network portion the method comprising: decoding either of said message of the first type and said message of the second type; and in response to said decoding, cause the firing of each post synaptic neuron associated to a pre-synaptic neuron that fired in said predetermined period of time.

An embodiment of the present disclosure comprises a method of transmitting firing information in a neural network system, the neural network system comprising a number p of neural network portions comprising each a group of Ni pre-synaptic neurons, with i=1 to p; the pre-synaptic neurons of each group being associated to a post-synaptic neuron; the method comprising: generating a message of the first or second type according to the method disclosed above for each neural network portion of the neural network system.

According to an embodiment of the present disclosure, each group of pre-synaptic neurons is associated to a distinct post-synaptic neuron.

According to an embodiment of the present disclosure, at least two of the groups of Ni pre-synaptic neurons share at least one common pre-synaptic neuron.

According to an embodiment of the present disclosure, the method further comprises synchronizing the messages of the first and second types as if the post and pre-synaptic neurons were located on a same computer node.

According to an embodiment of the present disclosure, the method further comprises providing in said messages of the first and second type a header indicating the type of the message.

According to an embodiment of the present disclosure, the method comprises indicating the number F in the header of said message of the first type.

According to an embodiment of the present disclosure, the sensitivity of the post synaptic neuron to the firing of at least some of the pre-synaptic neurons is plastic.

BRIEF DESCRIPTION OF THE DRAWINGS

The invention(s) may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Apparatus, systems, and/or methods are described to enable firing rate independent computations for neural networks, such as brain models, by improving the performance of communication between neuromorphic architectures.

The highly distributed nature of a neural network such as the animal nervous system presents a unique challenge in theoretical and computational modeling of neurobiology. Whether the neural network models are intended to provide a better understanding of biological function or build more intelligent agents, the comparatively limited parallelization inherent in all modern computing architectures should be overcome to achieve models that accurately represent the highly parallel nature of biology. Methods and systems according to the present disclosure may be applied to generic simulation environments as well as specialized computing environments such as neuromorphic architectures.

An embodiment of the present disclosure comprises simulating spiking neural networks. According to an embodiment of the present disclosure, simulating spiking neural networks may include integrating differential equations of a neuron model. A pre-synaptic neuron generates an action potential, or spike of current, once a voltage threshold has been reached in the neuron. The action potential or spike may then travel along the membrane of the pre-synaptic firing neuron and begin a signaling cascade at a synaptic junction that comprises the pre-synaptic firing neuron. This begins a chemical process that may communicate to post-synaptic neurons associated to the pre-synaptic neuron by the synaptic junction that the pre-synaptic neuron has fired.

Figure 1:
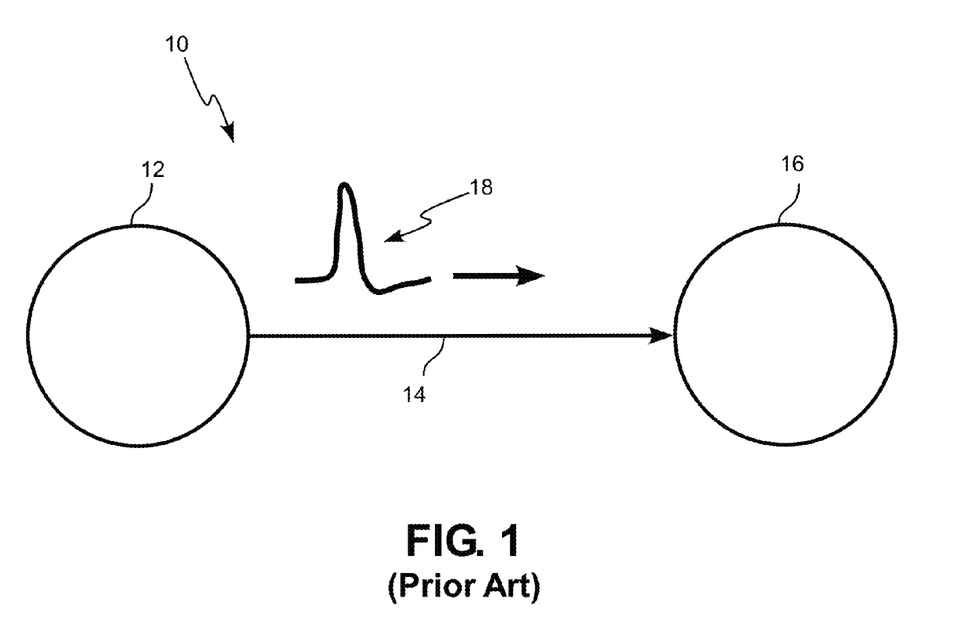
FIG. 1 illustrates a pre-synaptic neuron firing an action potential to an associated post-synaptic neuron.

FIG. 1 shows a modeling of a portion of a known spiking neural network 10 comprising a pre-synaptic neuron 12 associated by a synaptic junction 14 to a post synaptic neuron 16. FIG. 1 further illustrates neuron 12 firing an action potential 18. A number of variables and coupled differential equations can be involved in approximating both the voltage of the membrane of neuron 12 and the synaptic level changes (for example if synaptic junction 14 is plastic).

A neural network portion can comprise a large number of pre-synaptic neurons associated to a large number of post-synaptic neurons. When the number of neurons in a network is increased, the computational burden becomes large and thus, parallel and distributed simulations may be employed. For example, when simulating a neural network, different portions of the model can be simulated by separate computers in parallel. The neural model is integrated at each iteration, and firing information of pre-synaptic neurons is sent to all of the post-synaptic neurons associated to those that fired during a predetermined period of time corresponding to each iteration.

Figure 2:
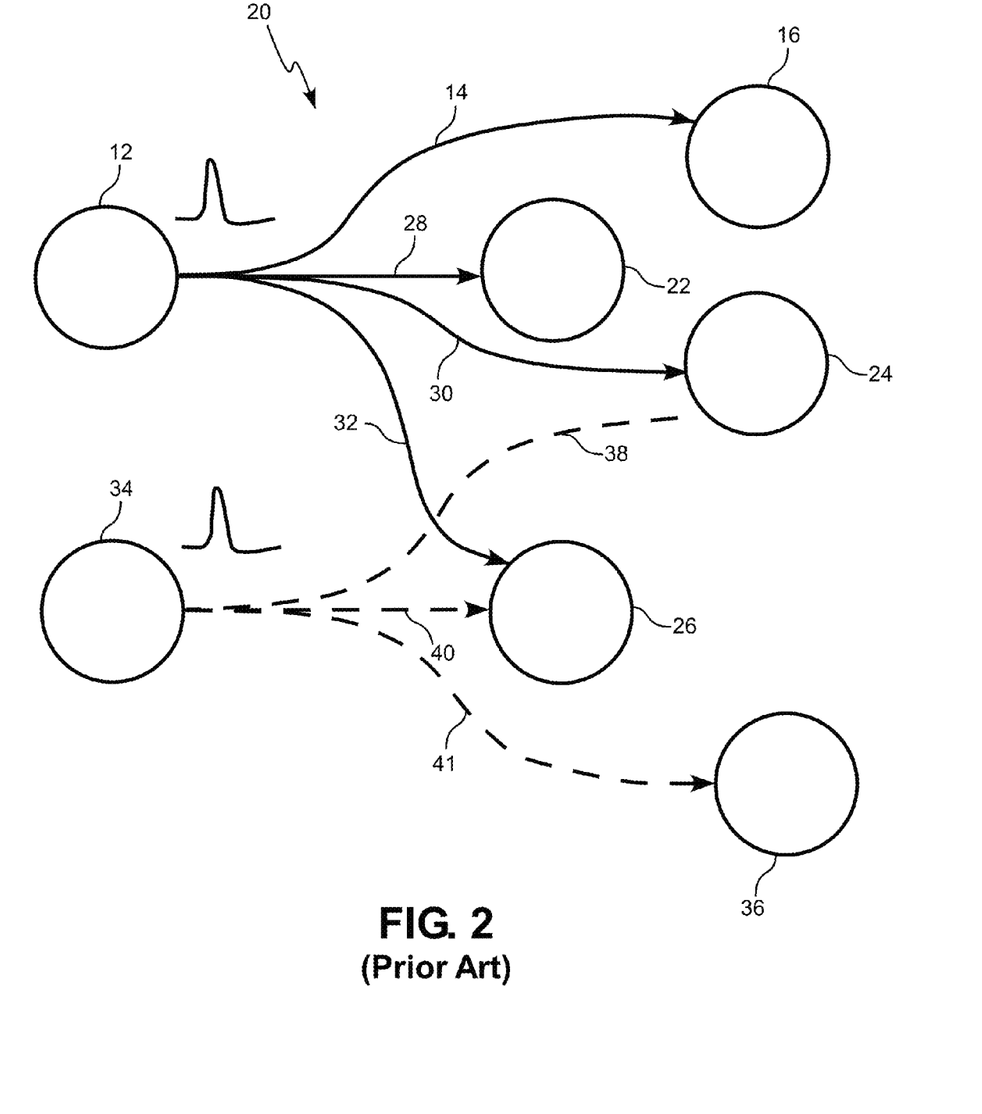
FIG. 2 illustrates pre-synaptic neurons firing an action potential to associated post-synaptic neurons.

FIG. 2 illustrates the modeling of a known neural network portion 20 comprising a pre-synaptic neuron 12 associated by a synaptic junction 14 to a post synaptic neuron 16, and also associated to post-synaptic neurons 22, 24 and 26 by synaptic junctions 28, 30 and 32. In FIG. 2, neural network portion 20 further comprises a pre-synaptic neuron 34 associated to post-synaptic neurons 24, 26 and 36 by synaptic junctions 38, 40 and 41. If for example, during a predetermined period of time corresponding to an iteration of the simulation of neural network portion 20, neuron 12 has fired and not neuron 34, the neural network sends to neurons 16, 22, 24 and 26 the information that neuron 12, associated via synaptic junctions 14, 28, 30 and 32, has fired. For the same period of time, if neuron 34 has not fired, no information is sent to neurons 24, 26 and 36 regarding neuron 34.

The synaptic junctions may be "plastic" junctions, i.e. the synaptic junctions may have the ability to strengthen or weaken over time, in response to increases or decreases in their activity. If the synaptic junctions are plastic, the above sending/not sending of information may lead in particular neurons 24 and 26, which have each two synaptic junctions, to increase the weight of synaptic junctions 30 and 32 and decrease the weight of synaptic junctions 38 and 40.

Figure 3:
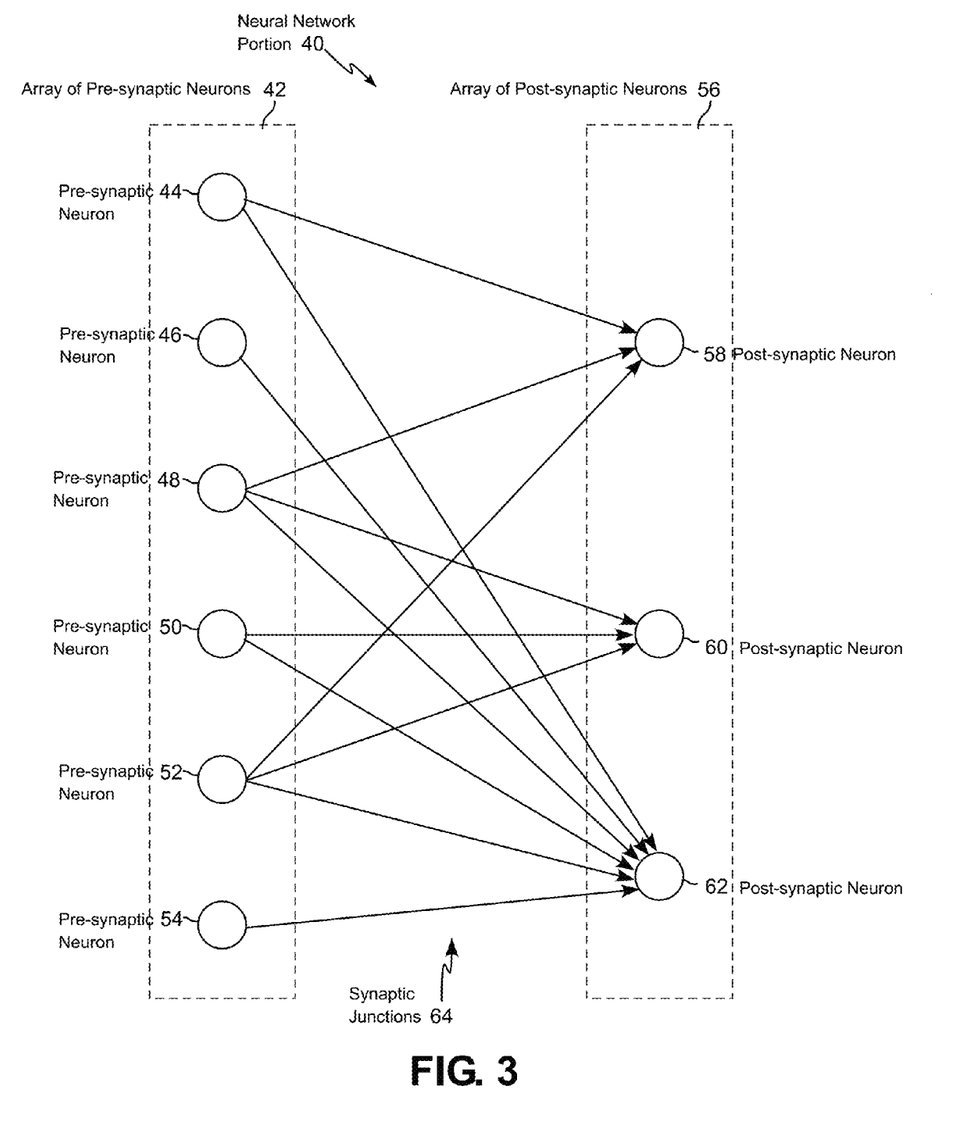
FIG. 3 illustrates a portion of neural network comprising a plurality of pre-synaptic neurons associated to a plurality of post-synaptic neurons.

FIG. 3 illustrates the modeling of a neural network portion 40 according to an embodiment of the present disclosure. Neural network portion 40 comprises an array 42 of pre-synaptic neurons 44, 46, 48, 50, 52 and 54. Array 42 is associated to an array 56 of post-synaptic neurons 58, 60 and 62 by a set of synaptic junctions 64. In the example illustrated, pre-synaptic neuron 44 is associated to post-synaptic neurons 58 and 62; pre-synaptic neuron 46 is associated to post-synaptic neuron 62; pre-synaptic neuron 48 is associated to post-synaptic neurons 58, 60 and 62; pre-synaptic neuron 50 is associated to post-synaptic neurons 60 and 62; pre-synaptic neuron 52 is associated to post-synaptic neurons 58, 60 and 62; and pre-synaptic neuron 54 is associated to post-synaptic neurons 62.

The synaptic junctions shown in the present figures are purely illustrative, and they should not be used to limit the scope of the present disclosure. According to an embodiment of the present disclosure, arrays 42 and 56 are present each on a different computer—or node—and the firing information of the neurons of array 42 are sent from a first computer/node to a second computer/node. As detailed hereafter, according to an embodiment of the present disclosure, when for example a neuron of array 42 of FIG. 3 fires an action potential during one simulation iteration, an identification number unique to the neuron that fired may be sent from the computer/node of array 42 to all of the computers/nodes (here, the computer/node of post-synaptic neurons array 56) that contain post-synaptic neurons associated to the one that fired.

For example, if only neurons 44 and 48 are fired during a predetermined period of the operation of neural network 40, the identification number of neuron 44 will be sent to neurons 58 and 62 and the identification number of neuron 48 will be sent to neurons 58, 60 and 62. On another hand the identification numbers of neurons 46, 50, 52 and 54 will not be sent to neurons 58, 60 and 62 for the same predetermined time period. As outlined above, if the synaptic junctions are plastic, the above sending/not sending of information may lead neurons 58, 60 and 62 to increase the weight of the synaptic junctions to neurons 44 and 48 and decrease the weight of the synaptic junctions to neurons 46, 50, 52 and 54. Again, it is noted that the synaptic junctions may be plastic, or not.

Generally, when parallelizing the simulation of spiking neural networks, the computational cost of the mathematical integration and synaptic computations is balanced with the cost of communicating information between nodes. Higher-performance architectures such as General Purpose Graphical Processing Units (GPGPU) and specialized neural hardware systems can be used in the nodes forming the neural network.

Some known hardware and software simulation environments include an AER scheme, where when a neuron fires an action potential, an identification (Id) number unique to the neuron is sent to the nodes that contain post-synaptic neurons associated to the one that fired. The addresses of all of the neurons that fire during an iteration are then collected and sent as a single packet to all of the associated nodes. According to an embodiment of the present disclosure, such an AER scheme can be used if certain conditions are met, as detailed hereafter.

As an illustration of an AER scheme, in FIG. 3 neurons 44, 46, 48, 50, 52 and 54 can be given the unique identification numbers/addresses of: 000, 001, 010, 011, 100 and 101, respectively. According to an embodiment of the present disclosure, a number N of pre-synaptic neurons, where $2^{n-1}<N<=2^n$, can be given each a unique identification number encoded on n bits. Alternatively, the unique identification number can also be encoded in a word of m bits, with m>=n, if for example the neuron network is simulated on computers that use words having a minimum of m bits.

In the example illustrated above where only neurons 44 and 48 are fired during a given time period of the simulation/operation of neural network 40, a packet comprising the identification numbers 000 and 010 will be sent to neurons 58 and 62. Similarly, a packet comprising the identification number 010 will be sent to neuron 60. The largest packet sent in the above examples comprises six bits having the values 000010.

If the number N of pre-synaptic neurons increases, the size of each single address increases and the size of the address packet increases. Further, if the number F of neurons that fired increases, the number of addresses increases and the size of the address packet increases. Thus, the time spent in communication may be a direct correlation to the number of neurons and the number of neurons that fired. Similarly, as the number of compute nodes increases, so does the number of packets that need to be sent. As outlined above, the pre-synaptic neurons of array 42 can be arranged on a first node according to an embodiment of the present disclosure. However, according to another embodiment of the present disclosure, the pre-synaptic neurons of array 42 can also be split between a plurality of first nodes.

In some cases, for both software and hardware based systems, the increase in the AER packet size and number can prevent scaling up to desirable model sizes.

Generally, if the unique identification number of the neurons of a node comprises n bits, a packet comprising F.n bits must be sent at each iteration, where F is the number of neurons among the N neurons that fired during the iteration and where a neuron can only fire 1 or 0 times during each iteration. In other words, if each unique identification number is encoded in a word of n bits, a packet comprising F.n bits must be sent at each iteration.

For example, returning to FIG. 3 and assuming that all of the 6 neurons 44, 46, 48, 50, 52 and 54 had fired, the node comprising array 42 would have to send to neuron 62 in the node comprising array 56 a packet comprising the identification numbers 000, 001, 010, 011, 100 and 101, i.e. a packet comprising 6×3 bits=18 bits.

The inventors have noted that, when the number F of neurons that fire in one iteration becomes larger than a predetermined threshold, a scheme different from the AER scheme detailed above can send information about which neuron fired in a more economical way than the AER scheme.

According to an embodiment of the present disclosure, for each iteration of simulation/operation of N neurons capable of firing toward a post-synaptic neuron, n being the number of bits on which a unique address of each pre-synaptic neuron can be coded and F being the number of pre-synaptic neuron firing during the iteration, if F.n>N, an AER scheme packet/message is replaced by an alternative packet/message comprising N bits, wherein each bit represent one of the N pre-synaptic neurons. According to an embodiment of the present disclosure each bit of the alternative packet/message can have a first value (such as 1) if the pre-synaptic neuron represented by the bit has fired during the iteration. Consistently, each bit of the alternative packet/message can have a second value (such as 0) if the pre-synaptic neuron represented by the bit has not fired during the iteration.

Figure 4:
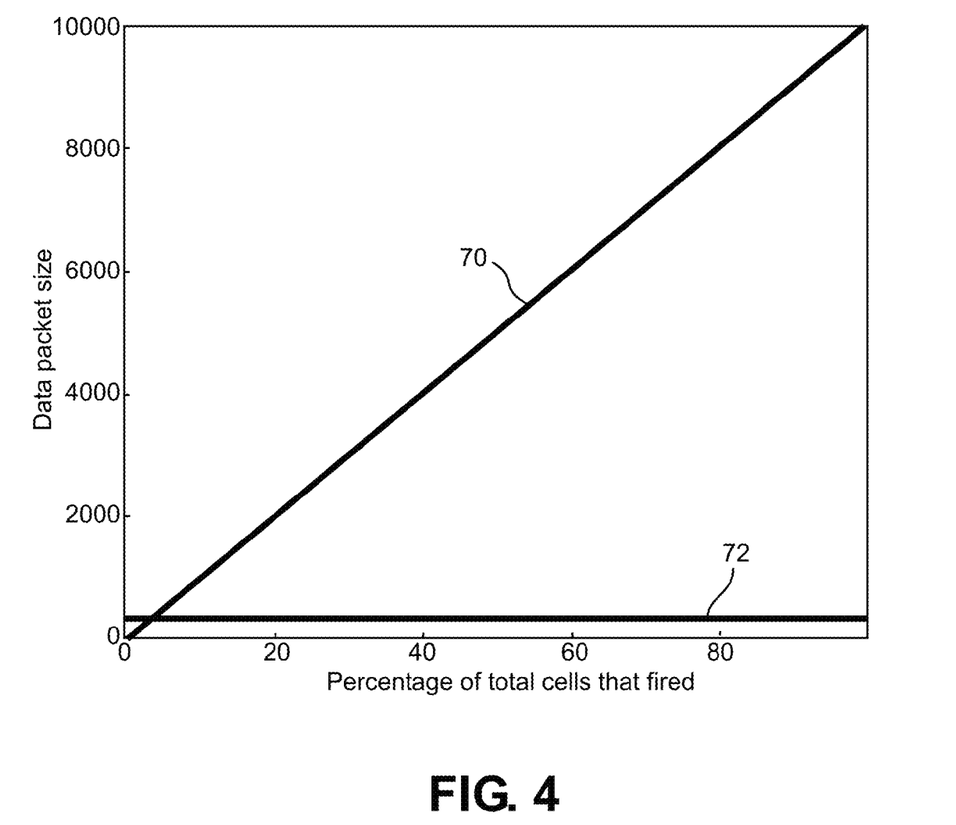
FIG. 4 illustrates an AER message size with respect to the number of neurons that have been fired in a neural network portion such as illustrated in FIG. 3.

FIG. 4 illustrates the variation 70 of the size of an AER message/packet with respect to the percentage of neurons that have been fired in an iteration of a neural network portion such as illustrated in FIG. 3 but comprising 10,000 pre-synaptic neurons in array 42, associated to at least one neuron in array 56. The size of the AER message/packet increases linearly from 0 to 10,000 words of 32 bits when the percentage of neurons firing increases from 0 to 100%. FIG. 4 also illustrates the constant size 72 of an alternative packet/message according to an embodiment of the present disclosure, comprising 10,000 bits, encoded as 313 words of 32 bits, where each bit represents one of said 10,000 pre-synaptic neurons.

In the exemplary network illustrated by FIG. 4, an AER scheme address packet using words of 32 bits is more economical than an alternative packet comprising N=10,000 bits only if the number F of neuron that fire is smaller than 313.

According to an embodiment of the present disclosure, for a neural network portion having N pre-synaptic neurons capable each of firing an action potential, wherein the number N can be encoded in a word of n bits, the neural network portion is provided for, upon firing of a number F of pre-synaptic neurons in an iteration's predetermined period of time:
  if F.n<N, generating a message of a first type such as an AER packet, the message comprising a unique address/ID number for each pre-synaptic neuron having fired in said predetermined period of time, each address being encoded as a word of n bits; and
  if F.n>N, generating a message of a second type, the message comprising N bits and being encoded in words of n bits, wherein each one of said N pre-synaptic neurons is represented by a unique bit, each bit having a first value (such as 1) if the pre-synaptic neuron represented by the bit has fired in said predetermined period of time, and a second value (such as 0) otherwise.

According to an embodiment of the present disclosure, the computations required to decode a message of the second type are independent from the number of neurons that fire, or firing rate.

According to an embodiment of the present disclosure, n can be chosen such that $2^{n-1}<N<=2^n$.

According to an embodiment of the present disclosure, at least one post synaptic neuron of the neural network portion is associated to the N pre-synaptic neurons and the neural network portion is provided to decode either the message of the first type or the message of the second type, and in response to said decoding, send to the at least one post synaptic neuron the information about which one of the N pre-synaptic neurons fired during the iteration.

According to an embodiment of the present disclosure, the pre-synaptic neurons are arranged in one or more first nodes of the neural network portion and the post-synaptic neuron is arranged in a second node of the neural network portion, and the communication of the data messages/packets from the first node can take a given time that may be longer than if all the neurons had been on a same node. According to an embodiment of the present disclosure, the neural network system is provided to synchronize all the messages as if the pre-synaptic neurons were located on a same computer node as the post-synaptic neuron. According to an alternative embodiment of the present disclosure, the nodes can also be arranged to operate asynchronously. This would happen for example when multiple neuromorphic processors are connected together According to an embodiment of the present disclosure, the messages of the first and second type comprise each a header indicating the type of the message. According to an embodiment of the present disclosure, the header of said message of the first type further indicates the number F.

According to an embodiment of the present disclosure, the sensitivity of the post synaptic neuron to the firing of each of the pre-synaptic neurons is plastic (i.e. the synaptic junction is plastic). According to an embodiment of the present disclosure, the synaptic junctions that are excitatory are plastic, and the synaptic junctions that are inhibitory are static, or non-plastic.

As illustrated in FIG. 3, according to an embodiment of the present disclosure, the second node (and array 56) can comprise a number p (p=3 in FIG. 3) of distinct post-synaptic neurons (58, 60, 62) associated each with a group of Ni pre-synaptic neurons, with i=1 to p (group of N1=3 pre-synaptic neurons 44, 48, 52 associated to post-synaptic neuron 58; group N2=3 of pre-synaptic neurons 48, 50, 52 associated to post-synaptic neuron 60; group of N3=6 pre-synaptic neurons 44, 46, 48, 50, 52, 54 associated to post-synaptic neuron 62). In FIG. 3, the plurality of groups of pre-synaptic neurons are located on a single node. However, according to an embodiment of the present disclosure, the plurality of groups of pre-synaptic neurons can be located on different nodes.

According to an embodiment of the present disclosure, at least two of the groups of pre-synaptic neurons share at least one common pre-synaptic neuron (e.g. 48 and 52 common to the two first groups; 44, 48 and 52 common to the first and third group; 48, 50 and 52 common to the second and third groups).

In a neural network system according to an embodiment of the present disclosure, where pre-synaptic neurons located on a plurality of first nodes are associated to post-synaptic neurons located on a second node, the communication of the various data messages/packets from the various first nodes can take various times. According to an embodiment of the present disclosure, the neural network system is provided to synchronize the messages as if all the pre-synaptic neurons were located on a same computer node.

Figure 5:
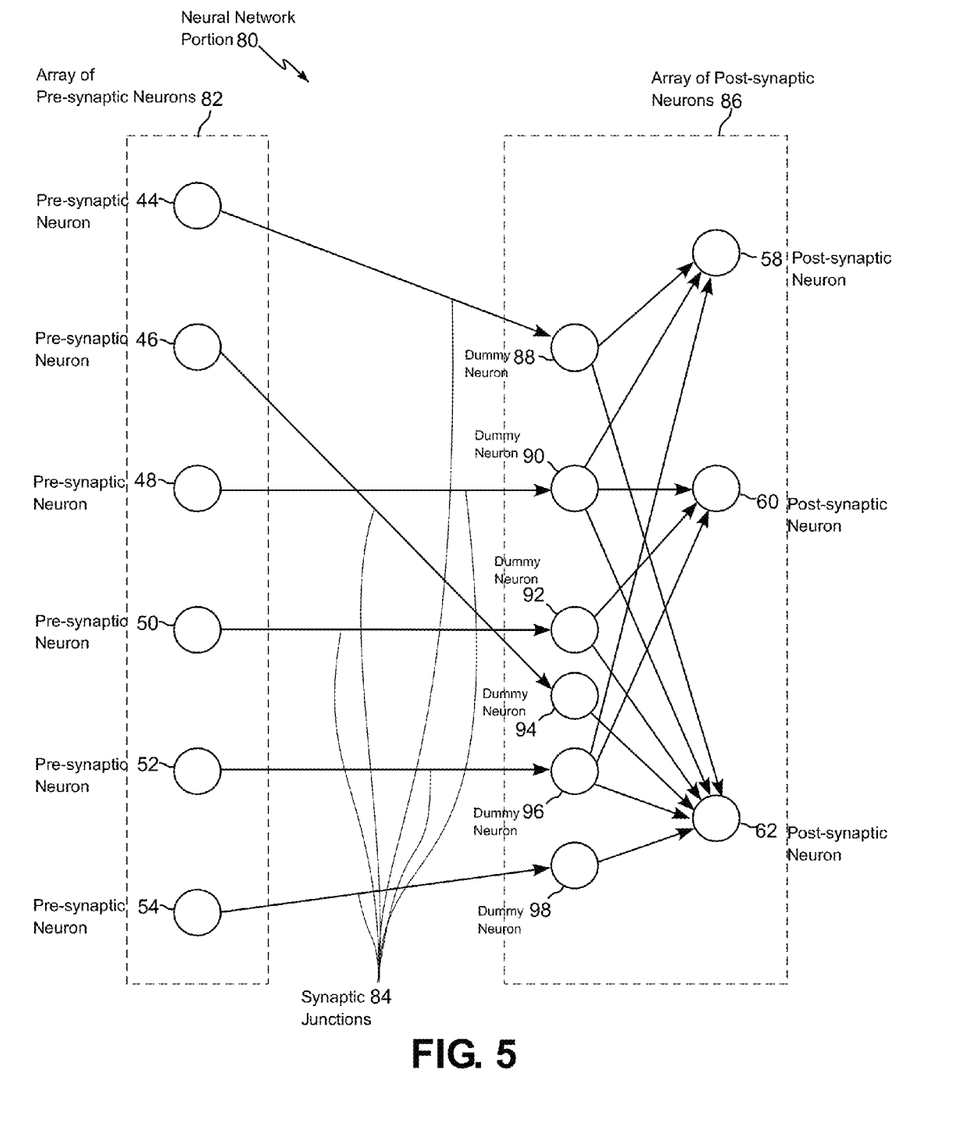
FIG. 5 illustrates a portion of neural network according to an embodiment of the present disclosure.

FIG. 5 illustrates the modeling of a neural network portion 80 according to an embodiment of the present disclosure, where "dummy" neurons are used to limit the amount of data exchanged between two nodes. The embodiment illustrated in FIG. 5 comprises, as the embodiment of FIG. 3, an array 82 of pre-synaptic neurons 44, 46, 48, 50, 52 and 54, in one or more first nodes, associated to an array 86 of post-synaptic neurons 58, 60 and 62 in a second node. According to an embodiment of the present disclosure, array 86 further comprises as many additional, or "dummy" neurons as there are pre-synaptic neurons in array 82, wherein each pre-synaptic neuron of array 82 is associated to a single additional, or "dummy" neuron of array 86. Each additional, or "dummy", neuron of array 86 is in turn associated to the post-synaptic neurons of array 86 in the same way as the pre-synaptic neurons were associated to the post-synaptic neurons in FIG. 3.

In the example illustrated in FIG. 5, pre-synaptic neuron 44 is associated via a synaptic junction 84 to a dummy neuron 88 of array 86, itself associated to post-synaptic neurons 58 and 62; pre-synaptic neuron 46 is associated to a dummy neuron 94 of array 86, itself associated to post-synaptic neuron 62; pre-synaptic neuron 48 is associated to a dummy neuron 90 of array 86, itself associated to post-synaptic neurons 58, 60 and 62; pre-synaptic neuron 50 is associated to a dummy neuron 92 of array 86, itself associated to post-synaptic neurons 60 and 62; pre-synaptic neuron 52 is associated to a dummy neuron 96 of array 86, itself associated to post-synaptic neurons 58, 60 and 62; and pre-synaptic neuron 54 is associated to a dummy neuron 98 of array 86, itself associated to post-synaptic neurons 62.

The additional neurons are called "dummy" neurons because they play no role in the operation of the neural network. The "dummy" neurons are used to reduce the number of synaptic junctions between arrays 82 and 86 to a single synaptic junction per pre-synaptic neuron of array 82.

According to an embodiment of the present disclosure, in a neural network portion comprising pre-synaptic neurons in at least a first node, associated each with a single dummy neuron in a second node, the neural network portion is provided to decode either of said message of the first type and said message of the second type, and in response to said decoding, cause the firing of each dummy neuron associated to a pre-synaptic neuron that fired. According to an embodiment of the present disclosure, the neural network portion is provided to synchronize the firing of the dummy nodes as if the post and pre-synaptic neurons were located on the second computer node.

Embodiments of the present disclosure also relate to methods of operating neural network portions such as illustrated in relation with FIG. 3 or 5.

Figure 6:
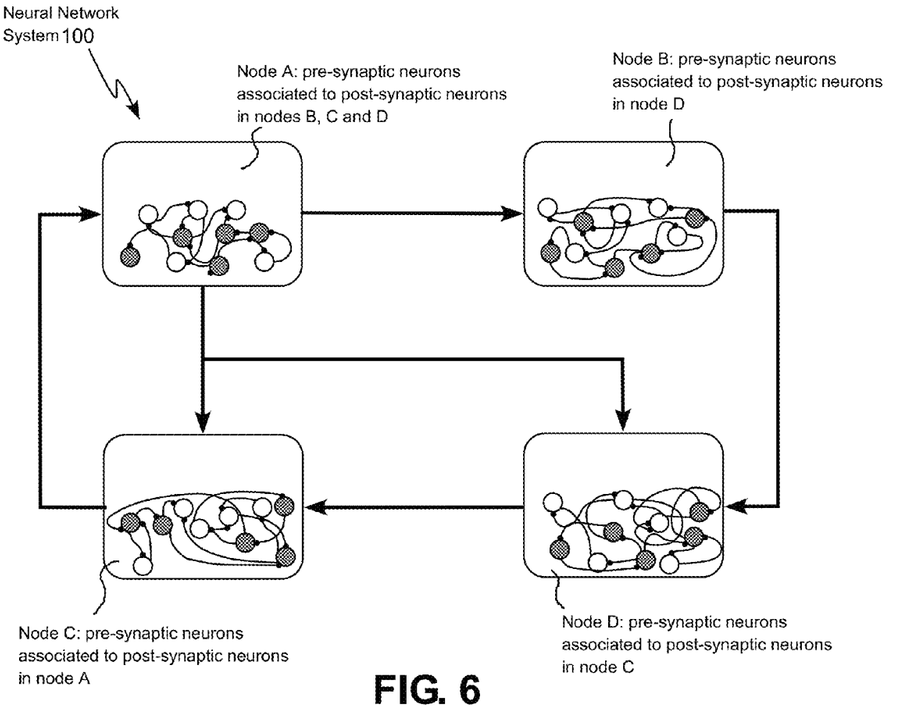
FIG. 6 illustrates a neural network system 100 according to an embodiment of the present disclosure

FIG. 6 illustrates a neural network system 100 according to an embodiment of the present disclosure, comprising four nodes A, B, C and D. In the example illustrated in FIG. 6, node A comprises pre-synaptic neurons associated to post-synaptic neurons in nodes B, C and D. Further, node B comprises pre-synaptic neurons associated to post-synaptic neurons in node D; node C comprises pre-synaptic neurons associated to post-synaptic neurons in node A; and node D comprises pre-synaptic neurons associated to post-synaptic neurons in node C.

As an example, node A comprises 1,000 pre-synaptic neurons associated to post-synaptic neurons in node B; 2,000 pre-synaptic neurons associated to post-synaptic neurons in node C, and 5,000 pre-synaptic neurons associated to post-synaptic neurons in node D. The total number of words required to encode each of these output groups in a bit-packed message of the second type, where one bit represents one pre-synaptic neuron, is given in Table 1 for words of 32 bits.

TABLE 1

Bit Encoding for different numbers of output Connections

| Total Output Neurons | Bit Encoding Size (in words of 32 bits) |
|---|---|
| 1000 | 32 |
| 2000 | 63 |
| 5000 | 157 |

Table 1: Bit Encoding for Different Numbers of Output Connections

As outlined above, for example in relation with FIG. 4, it is computationally cheaper to represent the neurons in a bit-packed notation according to an embodiment of the present disclosure versus an AER packet. We will now assume for example that on Node A at a particular iteration, 24 neurons associated to B fire an action potential, 50 neurons associated to C fire, and 100 neurons associated to D fire.

For F=24 and N=1000, with n=32, F.n=768 <1000. According to the present disclosure, an AER packet can be used. For F=50 and N=2000, with n=32, F.n=1535<2000. According to the present disclosure, an AER packet can be used. For F=100 and N=5000, with n=32, F.n=3200<5000. According to the present disclosure, an AER packet can be used.

On another hand, if for example 72 neurons that are associated to B fire and everything else is kept the same, then F.n=2304>1000 and according to an embodiment of the present disclosure a bit-packed method is used between nodes A and B. As outlined in table 1 above, in this case, only 63 words of 32 bits would have to be transferred instead of the 72 with an AER only method.

As outlines above, a header at the beginning of each packet may be used to facilitate the dynamic switching between the messages of the first and second types according to an embodiment of the present disclosure. For a message of the first type, (as an AER message), the header may be used to indicate the total number of firings contained in the current message. For a message of the second type, (as a bit-packed message) the header can comprise a negative value signaling the receiving node to process the packet as such. According to an embodiment of the present disclosure, the data described above as being contained in a header can also alternatively be transmitted in a separate packet or in any location of a packet with appropriate data identification.

Figure 7:
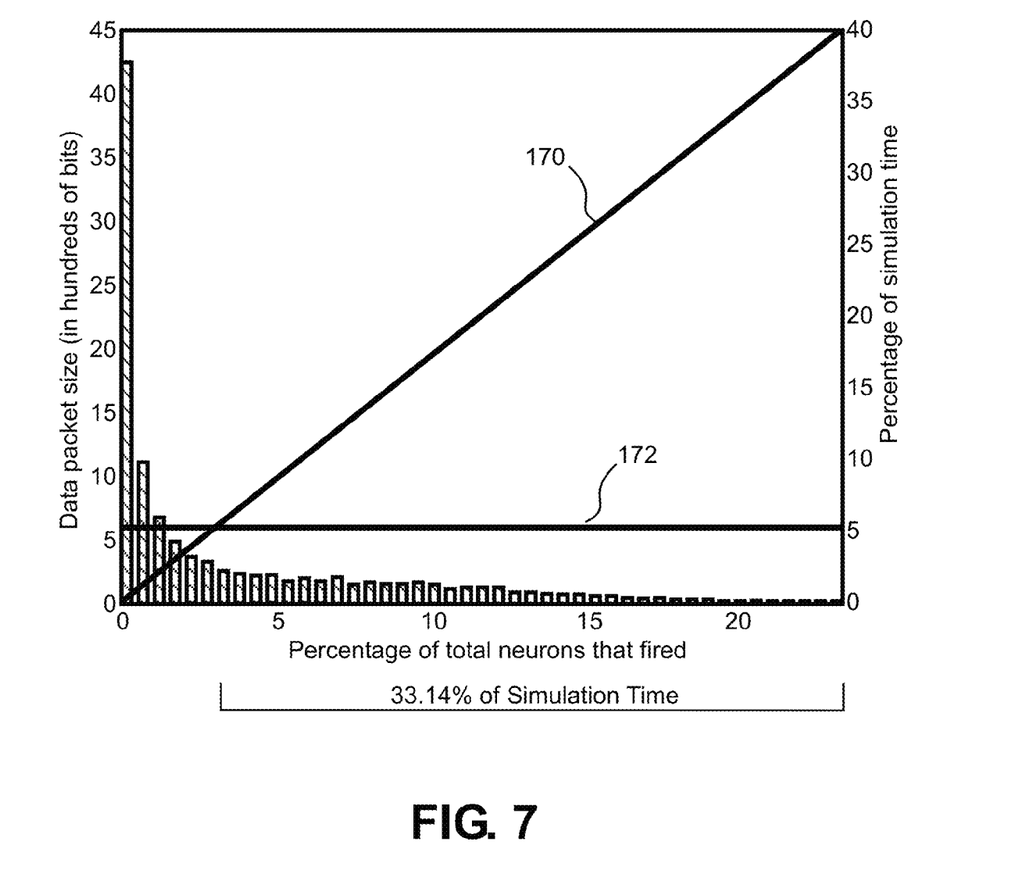
FIG. 7 illustrates an exemplary application of a method according to an embodiment of the present disclosure.

FIG. 7 illustrates an exemplary application of an embodiment of the present disclosure to a network modeling of the basal ganglia using 576 neurons. It takes 18 words of 32 bits to encode all 576 neurons, which is equivalent to encoding 3.125% of the largest address packet that can be sent with an AER scheme. FIG. 7 illustrates the linear variation 170 of the size (in hundreds of bits) of an AER message/packet with respect to the percentage of neurons that have been fired in an iteration of the neural network portion comprising 576 pre-synaptic neurons. FIG. 7 further illustrates with vertical rectangles the amount of simulation time spent for the different percentage of total cells that fired over a 5 second simulation for a basal level of activity (no inputs were given) with an AER scheme. The results showed that 33.14% of the simulation time with an AER scheme is spent in the region where more than 18 neurons fire. Thus, a method according to the present disclosure can allow reducing a third of the simulation time for a basal activity of the above-described modeling.

FIG. 7 further illustrates the constant size 172 of a message of the second type (bit packed message of 576 bits) according to an embodiment of the present disclosure, for the neural network portion comprising 576 pre-synaptic neurons. FIG. 7 also illustrates that the cumulated surface of the rectangles representing the amount of simulation time spent for more than 18 neurons that fired (3.125% of the total number of neurons) is equal to 33.14% of the total amount of simulation time.

In other words, in the embodiment illustrated in FIG. 7, N is equal to 576, where the number 576 can be encoded in a word of 32 bits; 32 being smaller than 576. According to an embodiment of the present disclosure, if the neural network portion fires a number F<18 of pre-synaptic neurons in a predetermined period of time, then F.n=F.32<576 and a message of the first type should be generated, the message comprising a unique address for each pre-synaptic neuron having fired in said predetermined period of time, each address being encoded as a word of 32 bits. On another hand, if the neural network portion fires a number of times F>18 of pre-synaptic neurons in a predetermined period of time, then F.n=F.32>576 and a message of a second type should be generated, the message comprising 576 bits and being encoded in words of 32 bits, wherein each one of said 576 pre-synaptic neurons is represented by a unique bit, each bit having a first value if the pre-synaptic neuron represented by the bit has fired in said predetermined period of time, and a second value otherwise. If F=18, F.n=18.32=576=N, either a message of the first type or of the second type can be generated.

The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated.

For example, instead of comparing F.n to N, an embodiment of the present disclosure can compare F.n to K.N (K multiplied by N), where K is a weighing factor larger than 1 or smaller than 1, so as to favor or hinder the generating of messages of the first type with respect to the generating of messages of the second type.

Further, the present disclosure relates to neural network portions or systems that can be simulated in computers or nodes, as detailed above, but also relates to neural network portions or systems that can be simulated by, or alternatively implemented as, hardware modules. According to an embodiment of the present disclosure, such hardware modules can then be provided for exchanging messages of the first or second types and/or for decoding such messages as detailed hereabove. Further, the present disclosure was described in relation with neural network portions or systems having neurons that only fire 1 or 0 times during each iteration. However, according to an embodiment of the present disclosure, the pre-synaptic neurons can be provided to fire more than 1 time per iteration. In such a case, each address in a message of the first type would also comprise data about how many times the neuron at the address has fired; and each bit in a message of the second type could be replaced by a group of bits of fixed size encoding how many times the neuron represented by the group of bits has fired.

It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . . "

It should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A neural network portion comprising a number N of hardware implemented pre-synaptic neurons capable each of firing an action potential, wherein N can be encoded in a word of n bits;
   the neural network portion being provided for, upon firing of a number F of hardware implemented pre-synaptic neurons in a predetermined period of time:
   if F.n<N, generating a message of a first type, the message comprising a unique address for each hardware implemented pre-synaptic neuron having fired in said predetermined period of time, each address being encoded as a word of n bits; and
   if F.n>N, generating a message of a second type, the message comprising N bits and being encoded in words of n bits, wherein each one of said N hardware implemented pre-synaptic neurons is represented by a unique bit, each bit having a first value if the hardware implemented pre-synaptic neuron represented by the bit has fired in said predetermined period of time, and a second value otherwise.

2. The neural network portion of claim 1, wherein $2^{n-1}<N<=2^n$.

3. The neural network portion of claim 1, further comprising a hardware implemented post synaptic neuron associated to at least some of the N hardware implemented pre-synaptic neurons, the neural network portion being second type and, in response to said decoding, send to the hardware implemented post synaptic neuron information of which one of the N hardware implemented pre-synaptic neurons associated to the hardware implemented post-synaptic neuron have fired in said predetermined period of time;
   the hardware implemented pre-synaptic neurons being arranged in a first node of the neural network portion and hardware implemented the post-synaptic neuron being arranged in a second node of the neural network portion.

4. The neural network portion of claim 3, wherein the neural network portion is provided to synchronize the messages of the first and second types as if the hardware implemented post and pre-synaptic neurons were located on a same computer node.

5. The neural network portion of claim 3, wherein the sensitivity of the hardware implemented post synaptic neuron to the firing of at least some of the hardware implemented pre-synaptic neurons is plastic.

6. The neural network portion of claim 1, further comprising a number N of hardware implemented post synaptic neurons associated each to a single hardware implemented pre-synaptic neuron, the neural network portion being provided to decode either of said message of the first type and said message of the second type, and in response to said decoding to cause the firing of each hardware implemented post synaptic neuron associated to a hardware implemented pre-synaptic neuron that fired in said predetermined period of time;
   the hardware implemented pre-synaptic neurons being arranged in a first node of the neural network portion and the hardware implemented post-synaptic neurons being arranged in a second node of the neural network portion.

7. The neural network portion of claim 1, wherein said messages of the first and second type comprise each a header indicating the type of the message.

8. The neural network portion of claim 7, wherein the header of said message of the first type further indicates the number F.

9. A neural network system comprising:
a number p of neural network portions i with i=1 to p; each neural network portion i comprising a number Ni of hardware implemented pre-synaptic neurons capable each of firing an action potential, wherein Ni can be encoded in a word of n bits;
each neural network portion i being provided for, upon firing of a number Fi of hardware implemented pre-synaptic neurons in a predetermined period of time:
if Fi.n<Ni, generating a message of a first type, the message comprising a unique address for each hardware implemented pre-synaptic neuron having fired in said predetermined period of time, each address being encoded as a word of n bits; and
if Fi.n>Ni, generating a message of a second type, the message comprising Ni bits and being encoded in words of n bits, wherein each one of said Ni hardware implemented pre-synaptic neurons is represented by a unique bit, each bit having a first value if the hardware implemented pre-synaptic neuron represented by the bit has fired in said predetermined period of time, and a second value otherwise;
wherein each neural network portion further comprises a hardware implemented post synaptic neuron associated to at least some of the Ni hardware implemented pre-synaptic neurons, the neural network portion being provided to decode either of said message of the first type and said message of the second type and, in response to said decoding, send to the hardware implemented post synaptic neuron information of which one of the Ni hardware implemented pre-synaptic neurons associated to the hardware implemented post-synaptic neuron have fired in said predetermined period of time;
the hardware implemented pre-synaptic neurons being arranged in a first node of the neural network portion and the hardware implemented post-synaptic neuron being arranged in a second node of the neural network portion.

10. The neural network system of claim 9, wherein the hardware implemented post-synaptic neurons associated with each group i of Ni hardware implemented pre-synaptic neurons are distinct.

11. The neural network system of claim 10, wherein at least two of the groups i of Ni hardware implemented pre-synaptic neurons share at least one common hardware implemented pre-synaptic neuron.

12. A method of transmitting firing information in a neural network portion comprising a number N of pre-synaptic neurons capable each of firing an action potential, wherein N can be encoded in a word of n bits;
the method comprising, upon firing of a number F of pre-synaptic neurons in a predetermined period of time:
if F.n<N, generating a message of a first type, the message comprising a unique address for each pre-synaptic neuron having fired in said predetermined period of time, each address being encoded as a word of n bits; and
if F.n>N, generating a message of a second type, the message comprising N bits and being encoded in words of n bits, wherein each one of said N pre-synaptic neurons is represented by a unique bit, each bit having a first value if the pre-synaptic neuron represented by the bit has fired in said predetermined period of time, and a second value otherwise.

13. The method of claim 12, wherein 2n−1<N<=2n.

14. The method of claim 12, wherein the neural network portion comprises a post synaptic neuron associated to at least some of the N pre-synaptic neurons; the pre-synaptic neurons being arranged in a first node of the neural network portion and the post-synaptic neuron being arranged in a second node of the neural network portion; the method comprising:
decoding either of said message of the first type and said message of the second type; and
in response to said decoding, sending to the post synaptic neuron information about which ones of the N pre-synaptic neurons associated to the post-synaptic neuron have fired in said predetermined period of time.

15. The method of claim 14, further comprising synchronizing the messages of the first and second types as if the post and pre-synaptic neurons were located on a same computer node.

16. The method of claim 14, wherein the sensitivity of the post synaptic neuron to the firing of at least some of the pre-synaptic neurons is plastic.

17. The method of claim 12, wherein the neural network portion comprises a number N of post synaptic neurons associated each to a single pre-synaptic neuron; the pre-synaptic neurons being arranged in a first node of the neural network portion and the post-synaptic neurons being arranged in a second node of the neural network portion the method comprising:
decoding either of said message of the first type and said message of the second type; and
in response to said decoding, cause the firing of each post synaptic neuron associated to a pre-synaptic neuron that fired in said predetermined period of time.

18. The method of claim 12, comprising providing in said messages of the first and second type a header indicating the type of the message.

19. The method of claim 18, comprising indicating the number F in the header of said message of the first type.

20. A method of transmitting firing information in a neural network system, the neural network system comprising a number p of neural network portions i, with i=1 to p, each neural network portion i comprising:
a number Ni of pre-synaptic neurons capable each of firing an action potential, wherein Ni can be encoded in a word of n bits;
a post synaptic neuron associated to at least some of the Ni pre-synaptic neurons, the pre-synaptic neurons being arranged in a first node of the neural network portion i and the post-synaptic neuron being arranged in a second node of the neural network portion i; and
the method comprising:
for each neural network portion i of the neural network system, generating a message of a first or second type according to the following method:
upon firing of a number Fi of pre-synaptic neurons in a predetermined period of time:
if Fi.n<Ni, generating a message of a first type, the message comprising a unique address for each pre-synaptic neuron having fired in said predetermined period of time, each address being encoded as a word of n bits; and
if Fi.n>Ni, generating a message of a second type, the message comprising Ni bits and being encoded in words of n bits, wherein each one of said Ni pre-synaptic neurons is represented by a unique bit, each bit having a first value if the pre-synaptic neuron represented by the bit has fired in said predetermined period of time, and a second value otherwise;

the method further comprising:

decoding either of said message of the first type and said message of the second type; and in response to said decoding, sending to the post synaptic neuron information about which ones of the Ni pre-synaptic neurons associated to the post-synaptic neuron have fired in said predetermined period of time.

21. The method of claim 20, wherein each group i of Ni pre-synaptic neurons is associated to a distinct post-synaptic neuron.

22. The method of claim 21, wherein at least two of the groups i of Ni pre-synaptic neurons share at least one common pre-synaptic neuron.

* * * * *